United States Patent [19]

Smith et al.

[11] 4,126,039
[45] Nov. 21, 1978

[54] PROJECTILE STRAIN DAMAGE INDICATING DEVICE

[75] Inventors: Chester L. Smith, Lake Hopatcong; David N. Everswick, Succasunna, both of N.J.

[73] Assignee: The United States of America as represented by the Secretary of the Army, Washington, D.C.

[21] Appl. No.: 800,774

[22] Filed: May 26, 1977

[51] Int. Cl.² ............................................. G01L 1/22
[52] U.S. Cl. .................................. 73/167; 73/133 R
[58] Field of Search .............. 73/167, 133 R, 88.5 R

[56] References Cited

U.S. PATENT DOCUMENTS

| 3,561,280 | 2/1971 | MacPhee et al. ................ 73/133 R |
| 3,733,424 | 5/1973 | Pitts et al. ........................ 73/88.5 R |
| 3,769,844 | 11/1973 | Skoures ............................ 73/517 R |

Primary Examiner—Richard C. Queisser
Assistant Examiner—Joseph W. Roskos
Attorney, Agent, or Firm—Nathan Edelberg; A. Victor Erkkila; Max Yarmovsky

[57] ABSTRACT

A projectile strain damage indicator utilizes a plurality of strain gages fixedly disposed on the orthogonal axes of a structural beam member which is operatively located within the ogive of a projectile. The strain gages provide electrical pulses to an energy conserving micropowered circuit which records strains only above a predetermined level that the projectile is subjected to while in transport.

7 Claims, 3 Drawing Figures

PROJECTILE STRAIN DAMAGE INDICATING DEVICE

GOVERNMENTAL INTEREST

The invention described herein may be manufactured, used and licensed by or for the Government for governmental purposes without the payment to us of any royalty thereon.

BACKGROUND OF THE INVENTION

Munition designers and packaging engineers have been continually in search of a practical and economical method for measuring and recording the stress factors placed upon the different pieces of munitions as they are transported under various environmental conditions to their site of storage and use. The inability to obtain accurate environmental field strain data on a projectile has been a problem for many years. Reliable environmental stress data is required to enable packaging engineers to realistically specify design performance and packing standards. The absence of environmental data feedback frequently results in overdesigned more costly munitions and equipment and overstated packaging requirements. In some instances production rejects and increasing costs are attributable to unnecessarily demanding test procedures. As a result of the aforementioned problems the overall cost effectiveness of munition programs are frequently reduced. Generally in order to introduce a safety factor in munition design the specifications are based on results of simulated "worst case" laboratory tests. The aforementioned "worst case" evaluation technique assumes transportation and handling conditions not generally prevalent and is, therefore, not a completely satisfactory solution to the designer's problem of properly balancing safety and cost. Installing prior art strain instrumentation devices to check the effects of shock and vibration forces on large quantities of shells during their transportation has been found to be impracticable.

In summary the prior art systems or techniques for determining the stress that a munition sees in transport has been found to be unsatisfactory. Large scale sampling to acquire statistical data is not generally practical because of the cost involved therein. In additon frequently the acquired data requires costly reduction processing. Prior art instrumentation packages could not function for extended periods because of excessive power consumption. Because of the fragile nature of the prior art instrumentation package it usually could not survive the test stress environment. Because of the configuration of the prior art instrumentation package it usually could not be secreted within the host item in order to insure against special handling and the subsequent acquisition of unbiased data. The prior art test procedure was frequently unrealistic. Laboratory tests generally simulate only the most severe conditions and fail to duplicate actual transportation environment.

SUMMARY OF THE INVENTION

This invention relates to an apparatus for measuring and recording the stress environment to which a munition item is subjected to during transportation from point of origin to final destination. The present device is capable of furnishing realistic environment stress data upon which packaging designers may establish performance, packaging, and test level criteria. The present invention will tend to upgrade the overall cost effectiveness of a munition development program because of the better information, on stress conditions the munition will see, that will be available to the designer.

An object of the present invention is to provide a projectile damage indicator instrumentation package which is reusuable following data read out and battery replacement.

Another object of the present invention is to provide a projectile damage indicator insuring extended battery powered operational life through the use of CMOS cmparator-counter circuitry in conjuction with silicon piezo-resistive transducers.

Another object of the present invention is to provide a projectile damage indicator device having solid state circuit components which are ruggedized to withstand high "G" shock and vibration forces.

Another object of the present invention is to provide a projectile damage indicator apparatus which has a shelf life of approximately two years duration.

A further object of the present invention is to provide a projectile damage indicatior device whose components and circuitry are sufficiently small to enable the unit to be undetectably secreted within a host item in order to insure impartial handling and acquisition of unbiased data.

For a better understanding of the present invention, together with other and further objects thereof, reference is made to the following descriptions taken in connection with the accompanying drawings.

BRIEF DESCRIPTION OF THE DRAWINGS

Throughout the following description like reference numerals are used to denote like parts of the drawings.

DESCRIPTION OF THE PREFERRED EMBODIMENTS

Figure 1:
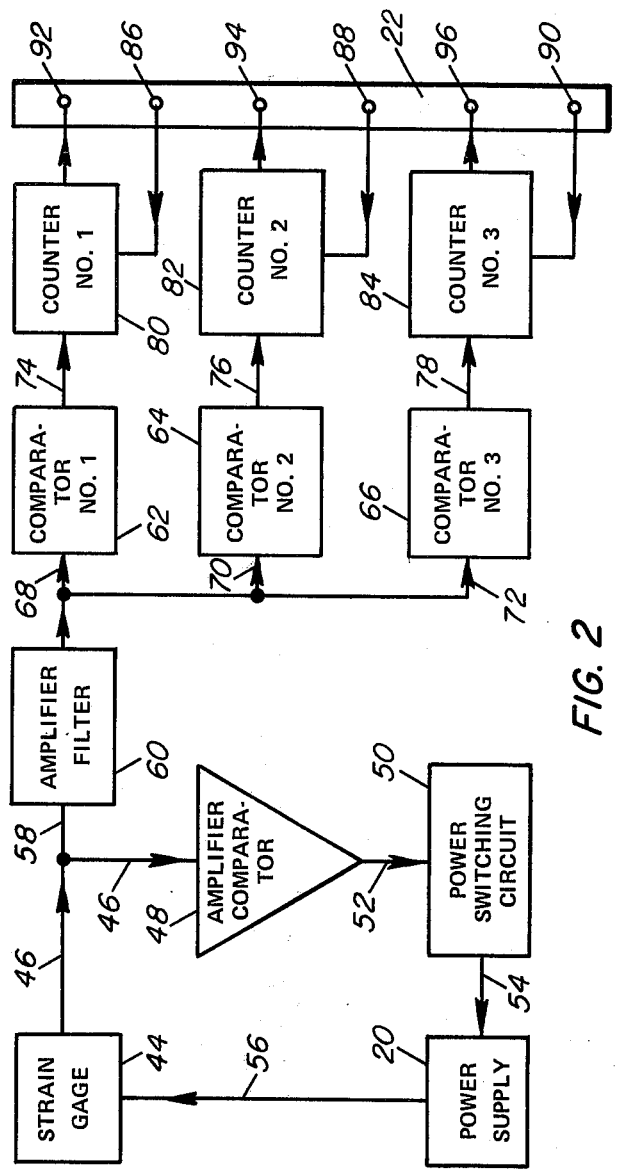
FIG. 1 is an isometric view of the plurality of strain gages orthogonally disposed on a structural beam and an electronic circuit package associated therewith the latter being fixedly mounted in an ogive fuze well of a projectile.

Referring now to FIG. 1, a cantilever beam member assembly 10 has an upper end 12 and a lower end 14. The beam member 10 has its lower end 14 fixedly held by the electrical circuitry unitized assembly 16 which comprises a power supply section 18, an electronic section 20 and a connector member 22. The electrical circuitry assembly 16 is rigidly secured within a cylindrically shaped fuze well in an ogive section of a projectile shell body not shown. The beam member assembly 10 is installed and positioned longitudinally within the ogive fuze well. The beam member upper end 12 is supported semi-rigidly therein by a plurality of equally spaced support rods 24. Beam member assembly 10 comprises three fixedly connected rectangular shaped sections, a "$y$", beam section 26, a transitional beam member 28, and an "$a-z$" beam section 30. The "$y$" beam section 26 and the "$x-z$" beam section 30 are fixedly held by transitional member 28 so that their transverse rectangular cross-sectional areas are fixedly disposed 90° with respect to each other and their longitudinal axes 42 are axially aligned. Three four element semiconductor bridges, piezoelectric type strain gages 32, 34 and 36, are used to measure the "y", "x" and "z" orthogonal coordinates of stress, respectively as experienced by the ogive section of the projectile. The first "y" axis strain gage 32 is fixedly attached to the flat side 38 of the "y" beam section. The second "x" axis strain gage 34 is fixedly attached to the flat side 40 of the "x-z" beam section 30 in order to cancel out any resistance change due to bending in the "x" axis direction. The "z" axis strain gage 36 and 36' will indicate only the compression, or tension forces along the longitudinal axis 42.

Figure 2:
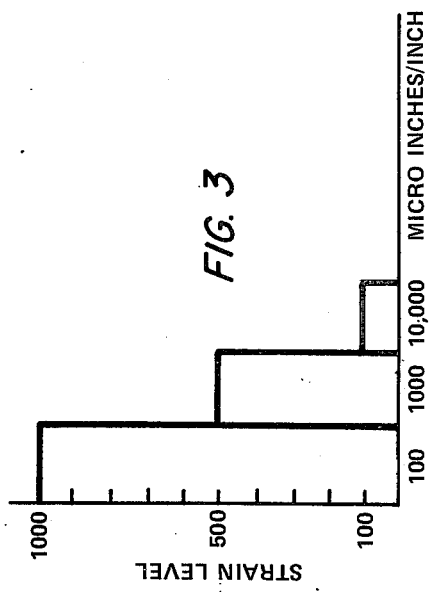
FIG. 2 is a schematic view of the projectile damage indicator circuitry.

Strain gages, 32, 34 and 36, such as manufactured by Kulite Semi-conductor Products Inc., Ridgefield, N.J., Models SS-5-350-06, or SG-6-350-050 are typical bridges which can be used in the circuit application shown in FIG. 2. The aforementioned strain gages 32, 34, and 36 have a gage resistance of approximately 10,000 ohms, a relatively high pulse output capability for their relatively small size, and good temperature coefficient response. Strain gages 32, 34 and 36 are electrically coupled to electrical circuitry section 18 by electrical conductors 31, 33 and 35 respectively.

Referring now to FIG. 2, each of three orthogonal axes have a strain gage, amplifier-filter, power saving circuit and counting network. The total counting network incorporates nine comparators, each axis having three preset levels, and nine dedicated counters. FIG. 2 is representative of one axis. Strain gages 44 are electrically coupled by a conductor 46 to a micropowered energy saving circuit comprising an amplifier-comparator 48 which is electrically connected with a power switching circuit 50 thru electrical conductor 52. The amplifier-comparator 48 and the power switching circuit 50 are designed to conserve the battery power of power supply 20 by maintaining the strain gages at a relatively low "idle" current condition until strains of a predetermined level are encountered by beam member assembly 10. The output of the power switching circuit 50 is electrically connected to power supply 20 by conductor 54. The power supply 20 is electrically coupled to the strain gage 44 by conductor 56. When a predetermined level of strain has been reached the strain gage 44 is brought up to full power switch circuit 50 to record the strain of interest by providing sufficient voltage to the strain gage 44 so it can generate an input voltage pulse via conductor 58 to the amplifier-filter component 60. After this pulse train passes the strain gage 44 reverts back to a low power idle state which is in the order of microwatts. A plurality of complementary metal oxide semiconductors (CMOS) comparators 62, 64 and 66 are electrically connected in parallel to the input of the amplifier filter 60 via electrical conductors 68, 70 and 72 respectively. Each comparators 62, 64 and 66 is set to generate a voltage output signal only after receiving an input voltage signal beyond a predetermined voltage level, via conductors 74, 76 and 78 respectively, to electrically coupled counters 80, 82 and 84. Counters 80, 82, and 84 have input interrogation terminals 86, 88 and 90 and output termials 92, 94 and 96 respectively. Complementary metal oxide semi-conductors are utilized in the comparator circuits 48, 62, 64 and 66 to take advantage of their low power consumption, proven high - "G" forces performance and their availablity in hybrid thick film packaging. The comparators 62, 64 and 66, amplifiers 48 and 60, counters 80, 82 and 84, and switch 50 are commercially available from RCA under model numbers CD4050, CD4007, CD4024 and CD4010 respectively. The power supply 20 employs a plurality of lithium sulfide batteries which provide an unattended operational life of approximately four to six months before replacement is required.

Figure 3:
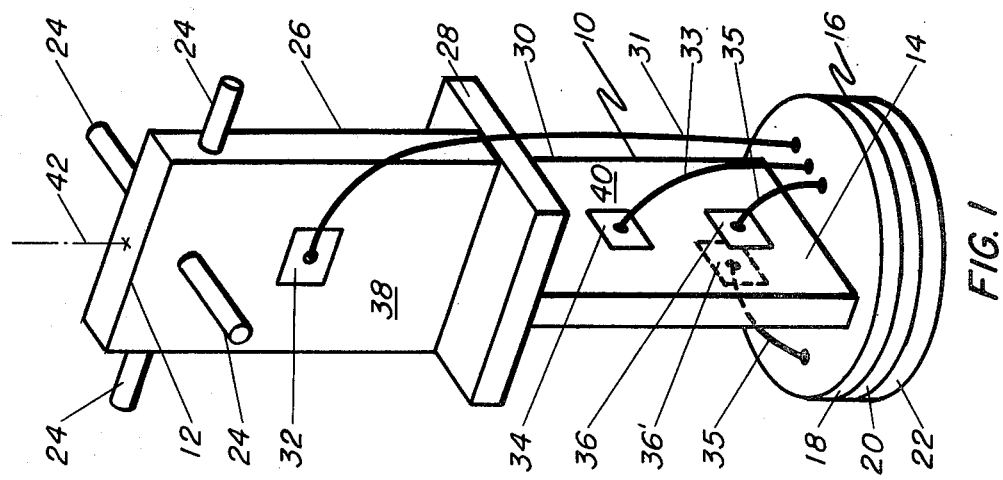
FIG. 3 is a bar graph showing relative strain levels for one axis of the structural beam in counts in memory versus strain comparator preset levels.

Referring now to FIG. 3, the bar plot shows typical number of counts indicated in the counters 80, 82 and 84 in response to the preset levels of strain activation established for comparators 80, 82 and 84. The plot shows the number of times that the strain level for one axis of the beam member 10 was exceeded.

In operation whenever the projectile is subjected to stress the strain gages 32, 34 and 36 measure deflection and the potentially damaging force being exerted on each of the projectiles three major axes. The data is measured in units of micro inches per inch and stored as quantized levels of stain in the counters. The amplifier-comparator 48 amplifies and compares the strain gage 44 output to a preset reference level. If the strain gage 44 voltage output exceeds this reference level, power switching circuit 50 is activated to apply full power from the power supply 20 to the strain gages 44 through conductor 56. The full power strain gage 44 output is now applied via conductor 58 through amplifier-filter 60 to the CMOS comparators 62, 64 and 66 via conductors 68, 70 and 72 respectively. The amplifier-filter 60 is designed to filter out the high frequency noise generated by the strain gages 44 and amplifies the strain gages residual output voltage due to strain on the beam member 10 working levels for the three comparators 62, 64 and 66. Whenever any of the three comparator threshold levels are exceeded for the particular axis being monitored the comparator will generate an output pulse indexing the dedicated counter electrically connected therewith and incrementing it by one. Each such occurrance also advances the lower level counters by one. The counters are the system memory for each particular threshold. Consequently the counter of the lowest preset comparator will indicate, as shown by the bar graph for 100 micro inches per inch in FIG. 3, the highest cummulative reading of strain levels which exceed the predetermined threshold.

Memory readout is accomplished by interrogating individual counters for each axis. An interrogation signal is applied to each counter through terminals 86, 88 and 90. The number of counts inputed to the counter to fill each one up is recorded. The counter records the number of mission counts. Therefor, the count complement is the data resulting from the experienced stress environments. The environmental data is in digital form requiring no additional processing before use. The digital form of the data facilitates the use of a very simple cost effective technique which permit readout and display of the data taken directly from output terminals 92, 94 and 96. Since the circuit assembly 16 and the structural beam member assembly 10 are designed as a plug-in module, the present invention may be accommodated by projectiles of various calibers with a minimum of modification to the shell and in a way which makes the instrumented round unrecognizable from a standard unmodified round.

While there has been described and illustrated specific embodiments of the invention, it will be obvious that various changes, modifications and additions can be made herein without departing from the field of the invention which should be limited only by the scope of the appended claims.

Having thus fully described the invention, what is claimed as new and desired to be secured by Letters Patent of the United States is:

1. A strain damage indicating device for evaluating environmental stress that a projectile is subjected to while in transport which comprises;

cantilever beam means longitudinally positioned in said projectile for deflecting in accordance with environmental stress applied to said projectile;

strain gage means fixedly disposed on said cantilever beam means for measuring deflection of said beam means in a plurality of orthogonally disposed axes;

amplifier-filter means electrically connected to the output of said strain gage means for filtering out high frequency noise generated by said strain gage means and amplyfying the residual output voltages of said strain gage means due to strain on said cantilever beam means;

comparator means, electrically coupled to the output of said amplifier-filter means, for generating voltage output signals only after receiving input signals of a predetermined voltage level;

counter means, electrically connected to the output of said comparator means, for recording the number of instances that said strain gage means generates output voltage signals above a predetermined voltage level, including means for interrogating said counter means to determine the number of counts contained therein; and power saving circuit means fixedly connected to one end of said beam means and electrically coupled to said strain gage means which includes a battery power supply electrically connected therein for conserving the reserve energy of said power supply by maintaining said strain gage means at a relatively low "idle" current until strains of a predetermined level are encountered and for activating said amplifier-filter means, comparator means and counter means circuitry upon said strains reaching said predetermined level.

2. A strain damage indicating device as recited in claim 1 wherein said cantilever beam means comprises:

a "$y$" rectangularly shaped beam section having a plurality of equally spaced supports rods protruding from a top end thereof;

a "$x$–$z$" rectangularly shaped beam section having a lower end fixedly connected to said power saving circuit means, said "$y$" beam section and "$x$–$z$" beam section having their longitudinal axes axially aligned; and a rectangularly shaped transitional member fixedly positoned intermediate the lower end of said "$y$" beam section and the upper end of said "$x$–$z$" beam section to fixedly hold said "$y$–$z$" beam sections fixedly together so that their transverse rectangular cross-sectional areas are fixedly disposed perpendicular to each other.

3. A strain damage indicating device as recited in claim 2 wherein said strain gage means comprises:

a first "$y$" axis bridge piezoelectric type strain gage electrically coupled to said powder saving circuit means fixedly disposed on a flat side of said "$y$"rectangularly shaped beam section.

a second "$x$" axis bridge piezoelectric type strain gage electrically coupled to said power saving circuit means and fixedly disposed on a flat side of said "$x$–$z$" rectangularly shaped beam section.

a third "$z$" axis bridge piezoelectric type strain gage electrically coupled to said power saving circuit means having a pair of transducer elements operatively mounted on opposite flat sides of said "$x$–$z$" rectangularly shaped beam section, said first, second and third strain gages measuring the "$y$", "$x$" and "$z$" orthogonal coordinates of stress experienced by said cantilever beam means.

4. A strain damage indicating device as recited in claim 3 wherein said power saving circuit means comprises:

an amplifier-comparator electrically coupled to the output of said strain gage means for maintaining said strain gage means at a relatively low "idle" current condition until strains of a predetermined level are encountered by said cantilever beam means;

a power switching circuit means, having an input electrically connected to the output of said amplifier comparator, said switching circuit being activated by said amplifier-comparator when said amplifier comparator has received a voltage signal from said strain gage means indicating said predetermined strain level has been exceeded; and power supply means electrically coupled to the output of said power switching circuit means for supplying full power to said strain gage means when said amplifier comparator detects a voltage signal generated by said strain gage means above said predetermined level.

5. A strain damage indicating device as recited in claim 4 wherein said power supply means comprises a plurality of lithium sulphide batteries electrically coupled to said strain gage means and said power switching circuit means having operational life capabilities of approximately four to six months duration.

6. A strain damage indicating device as recited in claim 1 wherein said comparator means comprises a plurality of complementary metal oxide semiconductor elements (CMOS) having inputs electrically coupled in parallel to the output of said amplifier-filter means, said plurality of complementary metal oxide semiconductors elements generating an output voltage signal only after receiving an input voltage signal of a predetermined voltage level.

7. A strain damage indicating device as recited in claim 4 wherein said amplifier-comparator comprises a complementary metal oxide semiconductor device.

* * * * *